United States Patent [19]

Conti

[11] Patent Number: 4,530,036
[45] Date of Patent: Jul. 16, 1985

[54] OBJECT ILLUMINATION APPARATUS

[76] Inventor: Mario W. Conti, 6733 Cantil St., Carlsbad, Calif. 92008

[21] Appl. No.: 572,508

[22] Filed: Jan. 20, 1984

[51] Int. Cl.³ .............................................. F21V 7/04
[52] U.S. Cl. .................................... 362/32; 362/311; 362/326; 362/433; 362/806
[58] Field of Search ................. 362/32, 311, 326, 433, 362/806

[56] References Cited

U.S. PATENT DOCUMENTS 4,428,029  1/1984  Baliozian ........................ 362/32 X Primary Examiner—Stephen J. Lechert, Jr.
Attorney, Agent, or Firm—Edgar W. Averill, Jr.

[57] ABSTRACT

An object illuminating apparatus for the display of art objects and the like. The apparatus directs a remote light source through a common grouping of optical fibers, and the like, to the proximity of the object being displayed. The initial grouping of fibers is further divided into smaller separate light directing arrays which are held within clear acrylic plastic tubes. Such tubes are heated and then selectively directed at various angles to cover the various surfaces of the object being displayed.

7 Claims, 3 Drawing Figures

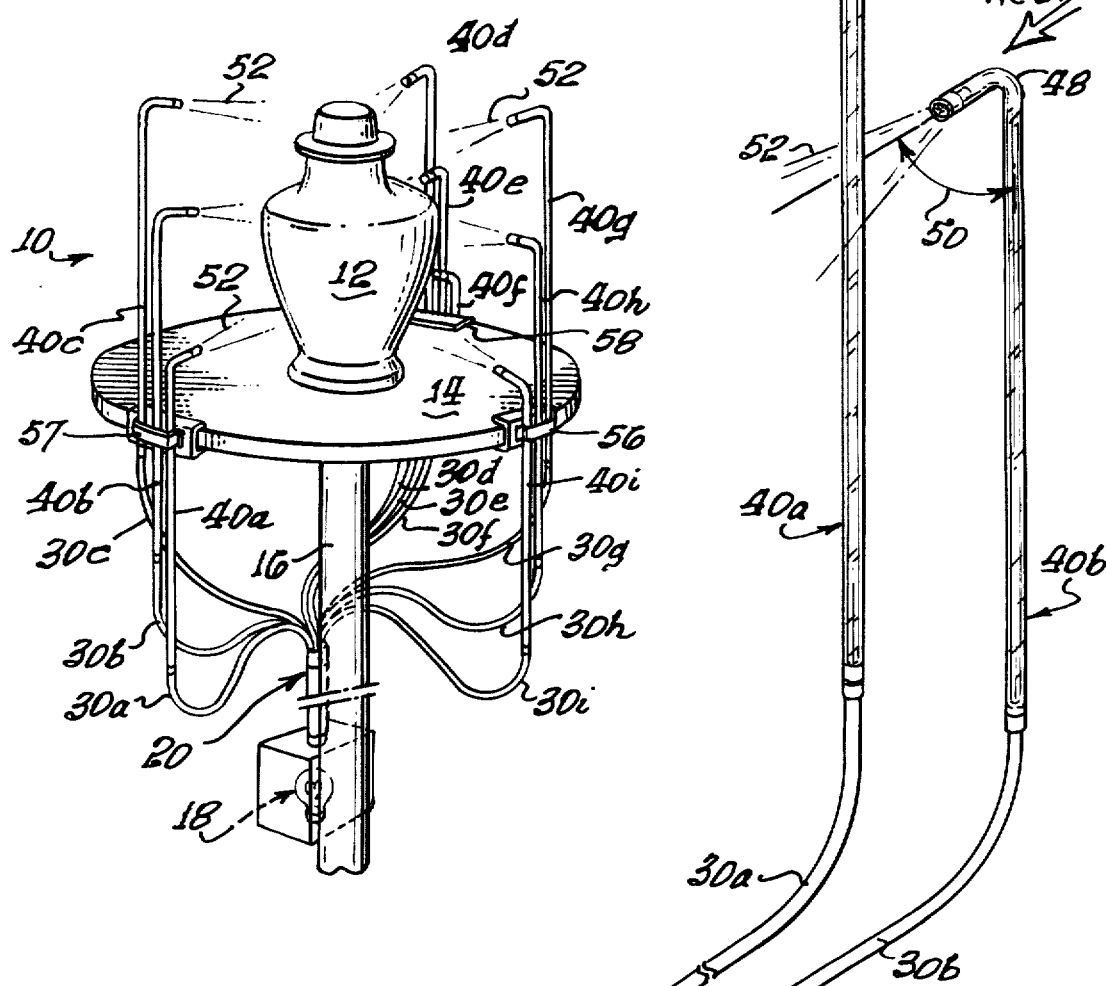
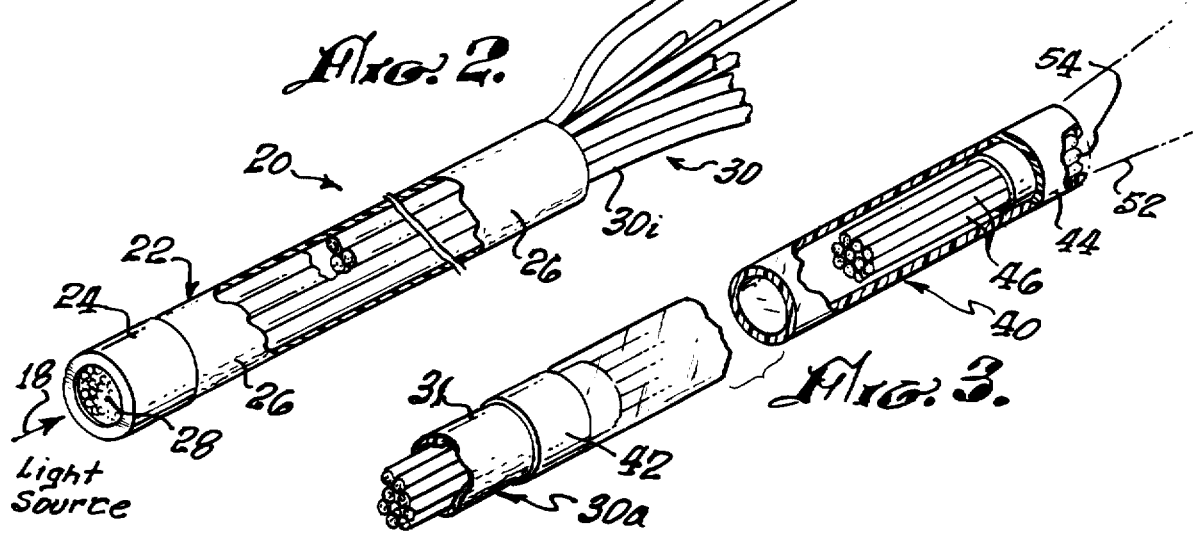

OBJECT ILLUMINATION APPARATUS

BACKGROUND OF THE DISCLOSURE

The field of the invention is in illuminating devices and more particularly relates to illuminating devices for displaying art objects and the like.

While there have been many methods and devices for illuminating art objects and the like for display, it has consistently been a problem to display such objects especially if they are of such a delicate nature that excessive heat and brightness can fade or otherwise damage them. One of the more common problems relating to illuminating such objects has been to bring illuminating light rays onto such objects in such a manner so as to properly highlight many of the configurations of such an object. There have been attempts to bring sources of light to the area of the object being displayed through light directing acrylic rods and the like, but such attempts have proven to be inadequate because the bending of such acrylic rods at even a moderate angle cause a loss of light.

SUMMARY OF THE INVENTION

It is an object of the present invention to provide an illuminating apparatus which is capable of directing light rays upon an art object, or the like, which is being displayed. It is a further object of the present invention to bring such light from a remote source wherein the source is not in the vicinity of the object being displayed. It is a further object of the present invention to provide such a light directing apparatus to direct such illuminating light to innumerable positions at the vicinity of the object being displayed.

These and other objects of the present invention and advantages of the invention will become apparent to those skilled in the art upon reading a description of a preferred embodiment which follows, in conjunction with a review of the appended drawings.

BRIEF DESCRIPTION OF THE DRAWINGS

FIG. 1 is a perspective view of a display assembly and the illuminating apparatus of the invention.

FIG. 2 is a fragmentary perspective view with certain portions being broken away, showing the illumination apparatus and the method by which it directs a source of light into the vicinity of the object being displayed.

FIG. 3 is an enlarged, fragmentary, perspective view with certain parts broken away, of the light directing and transmitting apparatus of the invention.

DESCRIPTION OF A PREFERRED EMBODIMENT

A display apparatus, generally indicated by reference character 10, is shown in FIG. 1 as having an object 12 resting on a table 14. A support post 16 for supporting the display table 14 is shown as having attached thereto a light source 18.

A light transporting and light directing assembly 20 is shown in FIGS. 1 and 2 as comprising a first common grouping of optical fibers at 22. An opaque covering 26 is shown as being affixed to a metallic sleeve 24 and having exposed ends 28 of the optical fibers. The term "optical fibers" is intended to mean conventional glass or plastic filaments made for the transmission of light. Such fibers are typically between 5 and 100 microns in diameter and are typically clad with a layer of another transparent material having a lower index of refraction.

By directing a focused beam of light at the exposed ends 28, the light exiting the terminus of the fibers will also be focused. Thus, for optimum illumination the light rays striking face 28 should be focused of slightly diverging.

FIG. 2 shows a number of secondary groupings of optical fibers as being divided from the initial common end 22. Preferably there is a sufficient number of groupings to provide enough light sources to properly illuminate the object. These individual groupings are shown as extensions 30a through 30i, each of which contains a plurality of optical fibers covered by a flexible protective covering. The covering 31 can be of any conventional flexible plastic, rubber or the like which permits the flexing of the bundles of optical fibers.

The extremities of the extensions 30a through 30i are shown as being covered with a number of thermoplastic tubes as shown by reference characters 40a through 40i. In FIG. 2, only tubes 40a and 40b are shown. In FIG. 3, these idividual tubing assemblies are shown to be attached to a metallic connector sleeve 42 at one end and an open end at metallic sleeve construction 44 at the very end of the assemblies 40a and 40b.

The individual optical fiber members 46 are shown as being grouped together in FIG. 3, and this plurality of fiber groupings allows the plastic tubular member 40 to be heated and bent at 48, as shown in FIG. 2, to a desired angle 50. The nature of optical fibers is such that as long as the ratio of the fiber diameter and radius of curvature of the bend is not such as to allow internally reflected rays to arrive at a point of the interior surface at less than the critical angle, only absorbtion losses will occur.

It follows that a quarter-inch diameter bundle of fibers can convey light around a much sharper curve than a single rod of the same diameter. The present invention has a marked advantage in being able to bend the tubing 40 to such angles so as to properly illuminate the object 12, as is shown in FIG. 1. The light being projected at 52 from the extreme ends 54 of the rods 46, is thusly errected at any conceivable point desired on such objects being displayed.

While rods 40 have been described as acrylic rods other thermoplastic materials can be used. The rods need not be transparent although transparent rods are particularly attractive for this purpose. The rods should be softened at a temperature which can be generated by a hot air gun and should not be softened at temperatures reached in unfocused sunlight.

In FIG. 1, I have shown a plurality of brackets 56, 57 and 58 which can be located at the edge of the platform, or table top 14, and the tubular members 40 can be moved vertically to any position desired in order to more fully illuminate the object 12.

The present embodiments of the invention are thus to be considered in all respects as illustrative and not restrictive, the scope of the invention being indicated by the appended claims rather than by the foregoing description. All changes which come within the meaning and range of equivalency of the claims therefore are intended to be embraced therein.

What is claimed is:

1. An illuminating apparatus for the illumination of art objects and the like which comprises:
    a light source;

an object support surface having optical fiber support means affixed thereto; and a plurality of optical fibers positioned adjacent said light source for transmitting light rays from the light source to the vicinity of an art object that is to be illuminated, said plurality of optical fibers being separated into at least two bundles of fibers, each of said bundles being encased in a flexible tube extending from the first end of the optical fibers which is near the light source and the second end of the fibers which is farther from the light source being encased in a thermoplastic tube said thermoplastic tube extending toward said light source a distance sufficient to contact said optical fiber support means and at least one of said thermoplastic tubes being curved at some point between said support means and said second end.

2. The illuminating apparatus of claim 1 wherein said thermoplastic tube is an acrylic thermoplastic.

3. The illuminating apparatus of claim 1 wherein said thermoplastic tube has been heated and bent to better direct the light in a desired direction.

4. The illuminating apparatus of claim 1 wherein there are at least six of said bundles of fibers.

5. The illuminating apparatus of claim 1 wherein said thermoplastic tube is at least six inches long.

6. The illuminating apparatus of claim 4 wherein said thermoplastic tube is about two feet long.

7. The illuminating apparatus of claim 1 wherein said light source is a focused light source.

* * * * *